D. DUDUIT.
Treating Copal Varnish.
No. 84,174.
Patented Nov. 17, 1868.
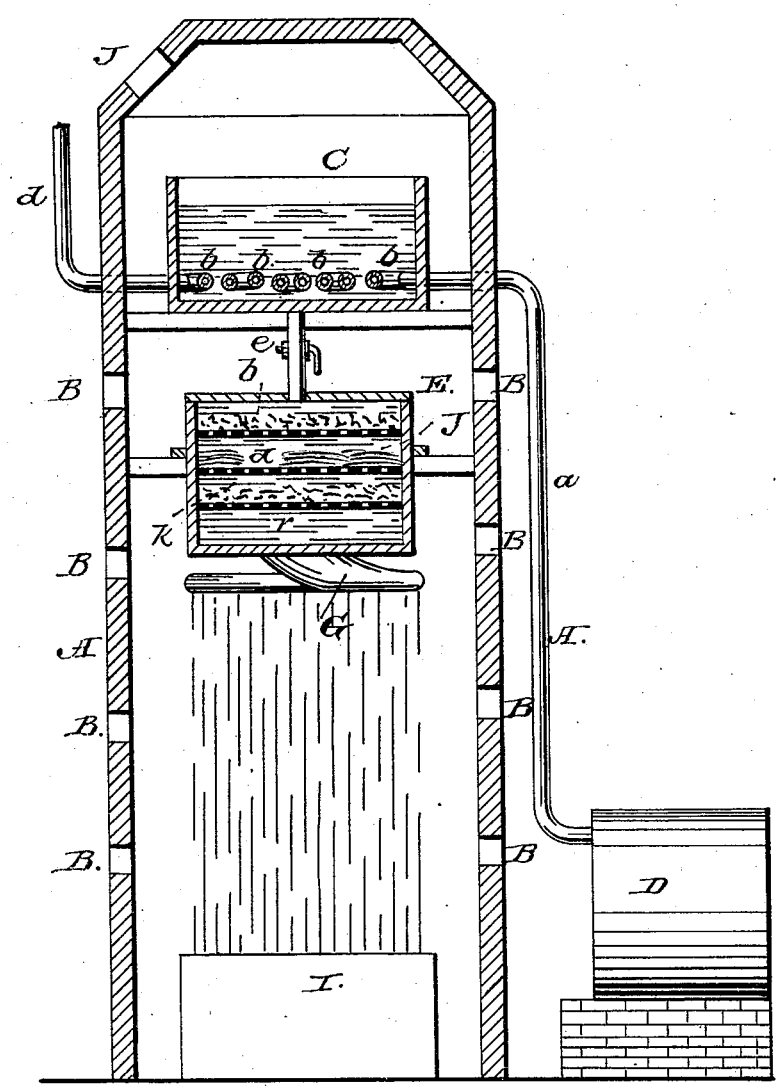

UNITED STATES PATENT OFFICE.

DESSO DUDUIT, OF NEW YORK, N. Y.

PROCESS FOR AGING AND RECTIFYING COPAL-VARNISH.

Specification forming part of Letters Patent No. 84,174, dated November 17, 1868.

*To all whom it may concern:*

Be it known that I, DESSO DUDUIT, of the city, county, and State of New York, have invented a new and Improved Process for Aging and Rectifying Copal-Varnish; and I do hereby declare that the following is a full, clear, and exact description thereof, which will enable others skilled in the art to make and use the same, reference being had to the accompanying drawings, forming part of this specification.

The drawing represents a sectional elevation of the apparatus employed in the process.

The object of this process is to clarify or rectify copal-varnish, and also to give it, in a few hours, that peculiar quality which renders it suitable for being used, and which, previous to my invention, required to be "aged"—that is to say, to stand from eight to ten months to allow this quality or change to obtain spontaneously.

I take the crude varnish and pump it into a tank, C, located in the top of a tower, A, of wood or stone. This tower is from thirty-five to fifty feet in height, and is provided with a series of windows or ventilating-openings, B, at different heights from the ground.

The oil in the tank C is boiled in any suitable manner; but I usually employ a coil of pipe, *b*, in the bottom of the tank, through which steam is passed from a boiler, D, on the ground, by means of a pipe, *a*, and discharging the waste steam into the air through any suitable pipe, *d*.

The tank C is open at the top, and is provided with a pipe, *e*, having a stop-cock.

This pipe leads from the bottom of the tank C into a closed screen-chamber, E, which contains three metal or other screens, *f*, *g*, and *h*, arranged one below the other, and extending horizontally across the said chamber.

On the first screen, *f*, I place a stratum of charcoal, inclosed in flannel; on the second screen, *g*, I place granulated brimstone, likewise inclosed in cloth; and on the third screen, *h*, is placed crystals of oxalic acid, preferably inclosed in cloth, as before mentioned.

The bottom of the screen-chamber is provided with a showering-coil, G, which leads from the bottom of the chamber, and is minutely perforated in its under side, to allow the varnish, after percolating through the several materials on the screens, to fall in a shower into a receiving-tank, I, at the bottom of the tower.

The perforations in the coil G are arranged at suitable distances apart, so as to prevent the confluence of the falling drops of varnish, and thus permit the thorough aeration of the same.

When the varnish has passed through the above process, and has been collected in the receiving-tank I, it is then ready for immediate use, being free from the certain oily elements which conduce to the formation of residual matter commonly known as "varnish-bottoms," and which is of little commercial value.

The varnish thus treated is also clear and strongly adhesive, and has the peculiar quality which enables it to "work well," and which, as before stated, was formerly the result of a spontaneous change occurring in the varnish from standing a great length of time.

The top of the lever is usually covered, but provided with openings J, to permit the escape of vapor resulting from the boiling and showering process.

It will be evident from the foregoing that my process consists, in general terms, in, first, boiling the crude varnish; second, passing it through charcoal, brimstone, and oxalic acid, successively; and, third, in showering it down in small separated streams or tricklings, by which it becomes aerated throughout.

This process is applicable to all varnishes made with turpentine, oil, and gum-copal, or the substitute for the latter known as "New Zealand gum."

Having thus described my invention, I claim as new and desire to secure by Letters Patent—

The process for rectifying and aging copal-varnish, substantially as herein described.

The above specification of my invention signed by me this 7th day of October, 1868.

DESSO DUDUIT.

Witnesses:
FRANK BLOCKLEY,
E. G. COLLINS.